June 26, 1945.  R. R. CURTIS  2,379,133
CENTRIFUGAL SEPARATOR PUMP
Filed Nov. 29, 1943
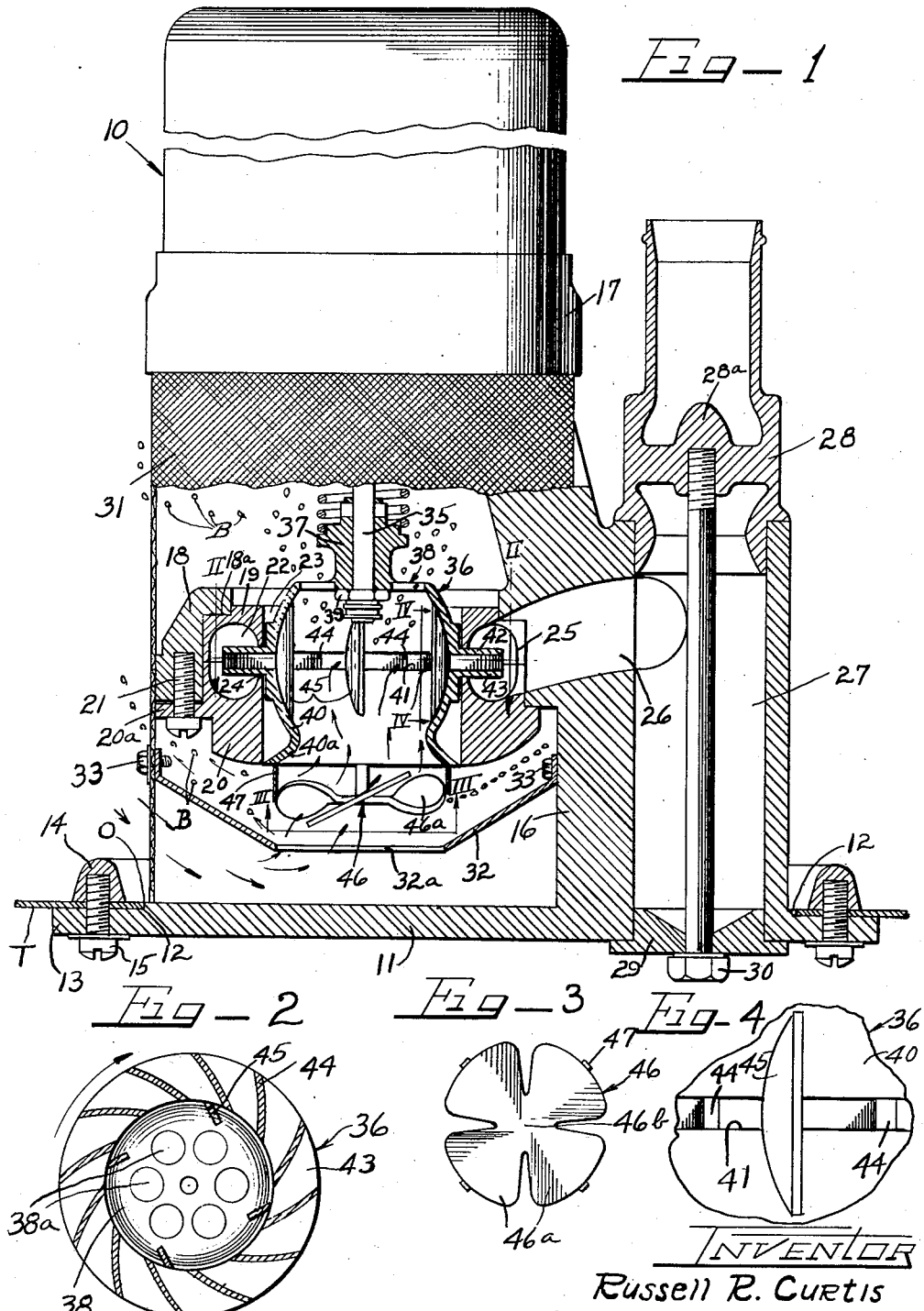
Inventor
Russell R. Curtis
by Charles W. Hills Attys Patented June 26, 1945

2,379,133

UNITED STATES PATENT OFFICE 2,379,133

CENTRIFUGAL SEPARATOR PUMP

Russell R. Curtis, Dayton, Ohio, assignor to Curtis Pump Company, Dayton, Ohio, a corporation of Ohio Application November 29, 1943, Serial No. 512,204

11 Claims. (Cl. 103—113)

This invention relates to a centrifugal gas and liquid separator especially adapted for separating gases and vapors from liquid fuel such as aircraft fuel and pressuring the fully liquid fuel sufficiently to prevent spontaneous separation of additional gases and vapors therefrom.

Specifically the invention relates to a pump and electric motor unit adapted to be submerged in a pond of fuel in an aircraft fuel tank for receiving fuel directly from the pond and whirl it to centrifugally separate the liquid and gaseous constituents thereof while pumping the fully liquid constituents and allowing the gaseous constituents to rise, in bubble form, through the pond where they may be eliminated at the surface of the pond.

According to this invention, an electric motor and centrifugal booster pump unit is arranged so that it may be directly mounted on a wall of a tank and project into the tank to be completely submerged in a pond of liquid in the tank. The electric motor drives a hollow open-ended impeller having a radially extending open-ended annular passageway intermediate the ends thereof containing pumping vanes or fins. This passageway discharges into an annular pumping chamber having a discharge outlet communicating with a fuel line.

The open-ended hollow impeller is suspended on a shaft driven by the electric motor in an open-ended passageway communicating at both open ends with the pond of liquid in the tank. The annular pumping chamber surrounds this path.

The impeller preferably carries, at its lower open end, an agitating propeller adapted to beat the liquid about to enter the impeller. The beating action on the liquid liberates bubbles of gas and vapor from the liquid, and the propeller creates a lateral stream of bubble-rich liquid which is caused to flow away from the inlet to the impeller. However, any liquid containing gases or vapors which does enter the impeller is centrifugally whirled by the impeller and centrifugal force will throw the fully liquid material outwardly while allowing the gases and vapors to rise through the axial center of the impeller and recirculate back to the pond of liquid. Any bubbles of gas and vapor created by the propeller or by centrifugal whirling of the liquid in the impeller will rise through the pond of liquid and burst at the surface of the pond to discharge the gases and vapors.

The unit of this invention is especially well adapted for use in aircraft fuel systems for preventing vapor lock in such systems. When a tank of liquid airplane fuel such as gasoline is subjected to sub-atmospheric pressures such as exist at high altitudes, dissolved and occluded air in the fuel is liberated together with gases from the more volatile ingredients of the fuel. If this air or these gases are allowed to enter the fuel line, they will soon cause a vapor lock and the aircraft engine will fail because of lack of sufficient fuel. The unit of this invention prevents entrance of air and gases into the fuel line and at the same time pressures liquid fuel in the line sufficiently so that it cannot gasify even when the aircraft is flying at very high altitudes.

It is, then, an object of the invention to provide a centrifugal separator pump which rejects gases and vapors and pumps only fully liquid material.

A still further object of the invention is to provide a gas and liquid separator which rejects gases and vapors and centrifugally pumps fully liquid material.

A still further object of the invention is to provide a centrifugal gas and liquid separator having an open-ended hollow impeller and an agitating propeller at one end of the impeller to beat out bubbles of gas and vapor from liquid about to enter the impeller.

A still further object of the invention is to provide a combined electric motor and centrifugal pump unit which will centrifugally whirl liquid such as airplane fuel for separating gases and vapors from the liquid fuel while pumping only fully liquid fuel.

A still further object of the invention is to provide a submerged booster pump unit adapted to be mounted in an aircraft fuel tank and separate gas and liquid from gas containing liquid material in the tank.

A still further object of the invention is to provide a pump and motor unit adapted to be submerged in airplane fuel for centrifugally separating the fuel into its constituent gases and liquids while pressuring the liquids sufficiently to prevent seperation of additional gases and vapors therefrom.

Other and further objects of the invention will be apparent to those skilled in the art from the following detailed description of the annexed sheet of drawings which, by way of preferred example only, illustrates one embodiment of the invention.

On the drawing:

Figure 1 is a side elevational view, with parts broken away and shown in vertical cross section, of a centrifugal separator pump and electric motor unit according to this invention mounted on the bottom wall of a tank and projecting into the tank to be submerged in liquids contained in the tank.

Figure 2 is a horizontal cross-sectional view taken along the line II—II of Figure 1.

Figure 3 is a bottom plan view taken along the line III—III of Figure 1.

Figure 4 is a fragmentary enlarged elevational view taken along the line IV—IV of Figure 1.

As shown on the drawing:

In Figure 1 the reference numeral 10 designates generally a pump and motor unit according to this invention. The unit 10 has a metal base 11 with an upstanding pilot portion 12 adapted to be inserted in the opening O in the bottom wall of a tank T. A peripheral flange 13 is provided on the base 11 around the pilot portion 12 for underlying the bottom wall of the tank T. A mounting ring 14 is disposed in the tank T on the bottom wall thereof around the opening O and screws 15 extending through the flange 13 and tank wall are threaded into the mounting ring 14 to fixedly mount the unit 10 on the tank for projecting into the tank to be completely surrounded by and submerged in liquid contained in the tank. An integral vertical leg 16 is provided on the base 11 to project upwardly into the tank T and support, at its upper end, a casing 17 for an electric motor. The leg 16 has an integral open-ended horizontal ring portion 18 projecting therefrom in spaced relation beneath the motor casing 17. This ring 18 receives a removable top ring 19 which is bottomed against a shoulder 18a thereof and a removable bottom ring 20 having a peripheral flange 20a extending radially therefrom and receiving screws such as 21 therethrough which are threaded into the ring 18. The removable rings 19 and 20 cooperate to define an annular pumping chamber 22 around an open-ended cylindrical path 23 defined by the inner peripheries of the rings. This pumping chamber 22 has an annular inlet 24 around the inner periphery thereof and an outlet 25 in the outer periphery thereof communicating with a discharge passageway 26 formed through the leg 16. The leg 16 also has an open-ended vertical passageway 27 therethrough communicating with the passageway 26 and receiving, at its top end, a fitting 28 for connection with an airplane fuel line or other discharge conduit (not shown). The lower end of the passageway 27 is closed by a cover 29. A bolt 30 extends through the cover 29 and is threaded into the central hub 28a of a spider provided in the fitting 28 for clamping both the cap 29 and the fitting into position. The positions of the fitting 28 and cap 29 can be reversed if it is desired to have the passageway 27 discharge out of the bottom of the tank.

A cylindrical screen 31 surrounds the ring 18 and extends from the base 11 to the motor casing 17.

A frusto-conical guide shield 32 is mounted on the leg 16 and on the screen 31 as by means of screws 33 in spaced relation beneath the ring 20. This guide shield 32 has a central aperture 32a therethrough adapted to receive liquids.

The motor in the casing 17 drives a shaft 35 which depends beneath the casing.

An impeller 36 has a hub portion 37 on an apertured top wall 38 thereof secured to the shaft as by means of a nut 39.

The impeller 36 has a bowed side wall 40 extending through the open-ended cylindrical path 23 provided by the inner peripheries of the removable rings 19 and 20. This bowed side wall has an annular gap 41 around its major diameter portion and top and bottom radially extending walls 42 and 43 continue the gap through the annular inlet 24 into the pumping chamber 22. A plurality of upstanding curved pumping vanes 44 are disposed between the walls 42 and 43 and terminate on their inner ends flush with the wall 40 and at their outer ends flush with the ends of the walls 42 and 43.

Vertical whirling vanes 45 are mounted in the impeller 36 on the bowed side wall 40 thereof and traverse the gap 41 to extend for a distance on either side of the gap. As shown in Figure 2, these whirling vanes 45 slope forwardly in the direction of rotation of the impeller as shown by the arrow. The pumping vanes 44 are curved for centrifugally discharging liquid through the gap 41 and along the passageway provided between the walls 42 and 43 into the pumping chamber 22.

The lower end of the side wall 40 is flared outwardly as at 40a to provide an enlarged inlet mouth to the interior of the impeller.

An agitating propeller 46 has a plurality of pitched vanes 46a radiating from the center 46b thereof as shown in Figure 3. The peripheral edges of these vanes 46a have upstanding tabs 47 secured thereon or integral therewith for suspending the propeller in spaced relation beneath the outwardly flared mouth of the impeller. These tabs 47 are secured to the outwardly flared portion 40a of the impeller side wall 40.

As shown in Figure 2, the top wall 38 of the impeller 36 has a plurality of holes or apertures 38a therethrough.

The impeller can be built up from two bowl-shaped metal stampings one of which has an apertured end wall 38 and the other of which has an outwardly flared open mouth 40a. The two bowl members each have radial flanges 42 and 43 around their peripheries connected by apertured vanes 44, which can be soldered or otherwise secured to the flanges. The resulting impeller unit therefore is a hollow barrel-shaped member with an annular radial discharge passageway projecting from the major diameter central portion thereof into the pumping chamber and containing centrifugal pumping vanes. The whirling vanes 45 can be soldered or otherwise secured to the inner face of the side wall 40 of the impeller.

In operation, liquid fuel from the tank T flows through the aperture 32a of the guide shield 32 and is acted upon by the agitating propeller 46 which beats the fuel to throw out a lateral stream of bubble-rich liquid containing bubbles B of gas and vapor. These bubbles will rise under the ring 20 and will pass through the screen 31 where they can continue to rise through the pond of fuel in the tank T to the surface of the pond, burst at the surface, and liberate the gases and vapors which can escape through a vent (not shown) in the top of the tank T. Liquid which passes through the propeller 46 enters the open-ended rotating impeller 36 and is whirled by the vanes 45. The fully liquid material being heavier than any gases or vapors contained therein will be thrown outwardly by centrifugal force to flow through the gap 41 and be acted upon by the pumping vanes 44 which will centrifugally discharge the liquid into and through the pumping chamber 22 from which it will be forced through the outlet 25 to passageway 26 into the passageway 27 and thence through the nipple 28 through the discharge line. Any gases or vapors entering the impeller 36 with the liquid will remain toward the axial center of the impeller, since the fully liquid material will be thrown by the centrifugal force away from this axial center. Bubbles containing gas and vapor can therefore rise through the impeller 36 and pass through the holes 38a in the top wall of the impeller to continue to rise through the pond in the upper part of the screen 31 and eventually flow out through the screen into the pond surrounding the unit where they can rise to the surface of the pond.

The unit of this invention thus has a multiple action on liquid material which it receives. This liquid material is first agitated or beaten to liberate bubbles of gas and vapor therefrom. A lateral stream of bubble-rich liquid is created by this beating and agitating action to flow away from the inlet to the pump. Therefore liquids about to enter the pump are initially treated to liberate gases and to actually vaporize highly volatile liquids about to gasify. The agitation creates a lateral stream away from the mouth of the pump for rejecting the bubble-rich material. At the same time the pitch of the agitating propeller at the inlet mouth of the pump somewhat pressures the fully liquid material into the mouth of the main impeller. This impeller is open-ended and has whirling vanes therein for spinning or rotating the liquid to create a vortex. Any liquids about to gasify, or any gases or vapors which pass the agitating propeller remain in the center of the whirling vortex and rise through the impeller out of the pump. The heavier, fully liquid material is thrown by centrifugal action into an open-ended radially extending passageway which contains pumping vanes. The fully liquid material in this passageway is pressured by the pumping vanes and by centrifugal force into an annular pumping chamber which discharges into a discharge passageway. Pressured material from the pumping chamber can be maintained at pressures sufficiently high to prevent spontaneous separation of additional gases and vapors from the liquid.

The units of this invention are compact, lightweight, and especially well adapted for booster pumps in airplane fuel systems since they can be directly mounted in or on an airplane fuel tank and pressure only fully liquid fuel from the tank into a fuel line thereby preventing vapor lock in the line.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A centrifugal gas and liquid separator comprising a pump and electric motor unit adapted to be submerged in a liquid filled tank, means including an open-ended hollow impeller driven by said motor and defining an open-ended unobstructed liquid flow path surrounded by and in annular communication with a pumping chamber, said impeller having a hollow annular portion intermediate the ends thereof projecting radially into said pumping chamber, spaced pumping vanes in said hollow annular portion of the impeller for centrifugally discharging liquid into the pumping chamber, vanes projecting into said impeller for whirling fluid entering the impeller to centrifugally separate gases and liquids, and an agitating propeller suspended on said impeller at the inlet of said liquid flow path adapted to beat out bubbles of gas and vapor from liquid about to enter the impeller and centrifugally deflect a substantial portion of said bubbles away from said inlet.

2. A centrifugal gas and liquid separator comprising a pump and motor unit, a hollow open-ended impeller driven by the motor of said unit and adapted to receive liquid to be pumped centrally therethrough along an unobstructed path, said impeller having an annular discharge passageway intermediate the open ends thereof, radially extending pumping vanes for acting on liquid passed through said discharge passageway, an annular pumping chamber receiving liquid from said vanes, and means extending substantially radially inwardly of said impeller for whirling liquids therein to centrifugally separate the gas and liquid constituents thereof whereby the gases will pass through the impeller while the liquids will be centrifugally thrown out of the impeller and pressured by said pumping vanes.

3. A centrifugal separator pump comprising means including a rotatably mounted impeller defining an open-ended path and an annular pumping chamber surrounding said path, an inlet mouth at one end of the path and an outlet at the other end of the path together with a centrifugal discharge passageway extending into said pumping chamber, pumping vanes in said discharge passageway, and whirling vanes on said impeller extending beyond both extremities of said pumping vanes and projecting into the impeller in advance of said pumping vanes to whirl liquids received through the mouth of the impeller before said liquids reach the pumping vanes whereby heavier liquids will be thrown out by centrifugal force into said annular passageway and pumped by said vanes while lighter gases will rise substantially centrally through the impeller.

4. A centrifugal separator booster pump adapted for aircraft fuel systems comprising a pump casing adapted to be mounted on a fuel tank and defining an annular pumping chamber, a hollow impeller of substantially circular cross-section, coaxially disposed within said pumping chamber and having an inlet mouth at the lower end thereof and a discharge outlet at the upper end thereof forming an unobstructed axial path, together with a radially extending passageway intermediate said ends communicating with said pumping chamber, and means for rotating said impeller.

5. A centrifugal separator booster pump adapted for aircraft fuel systems comprising a pump and motor unit adapted to be submerged in an aircraft fuel tank and having an open-ended hollow impeller defining a localized flow path of substantially circular cross-section therethrough forming an unobstructed path for fuel, vanes in said impeller extending substantially radially inwardly thereof for whirling fuel flowing therethrough to separate gases and vapors from fully liquid fuel, said impeller having a radially extending discharge passageway, and pumping vanes in said passageway for centrifugally discharging liquid through the passageway.

6. A centrifugal separator pump comprising a prime mover, a drive shaft extending from said prime mover, an impeller suspended on said drive shaft defining a barrel-shaped passageway with an enlarged outwardly flaring mouth at the lower end thereof and apertures through the upper end thereof, spaced opposed walls extending radially from said impeller to provide a discharge passageway communicating with the major diameter portion of the impeller, pumping vanes in said passageway in spaced opposed relation to define open-ended pumping channels therebetween, and vanes extending lengthwise of said impeller projecting into the interior of the impeller for whirling fluid flowing through the impeller to create a whirling vortex in the impeller with fully liquid material being radially discharged into said passageway and pumped by said pumping vanes and lighter gases and vapors rising through the axial center of the impeller out of the open top end thereof.

7. A centrifugal separator pump comprising a hollow barrel-shaped impeller having an open bottom inlet mouth and an apertured top wall, driving means coupled to said top wall, spaced opposed walls projecting radially from said impeller intermediate the ends thereof defining an annular passageway communicating with the interior of the impeller, and upstanding vanes in said passageway in spaced relation defining pumping vanes therebetween whereby fluids flowing through the impeller will be centrifugally discharged into said pumping channels.

8. A centrifugal separator pump comprising means defining a pumping chamber having a central annular inlet and a peripheral outlet, a hollow impeller projecting through said inlet defining open-ended pumping channels including pumping vanes communicating with the pumping chamber, vanes for whirling liquid in said impeller in advance of said pumping vanes, and an agitating propeller carried by said impeller to act on liquid about to enter the impeller and centrifugally deflect a substantial part of the bubbles developed away from the impeller inlet.

9. A pump impeller comprising a hollow barrel-shaped member having an outwardly flaring inlet mouth at one end thereof and an apertured wall at the other end thereof, an agitating propeller suspended from the inlet mouth of the impeller in advance of said inlet mouth, said impeller having spaced opposed radial flanges intermediate the ends thereof defining an annular passageway communicating at its inner end with the major diameter portion of the impeller, spaced opposed pumping vanes in said passageway defining pumping channels therebetween, and upstanding whirling vanes secured in said impeller in advance of said pumping vanes for whirling materials in the impeller.

10. A pump impeller comprising a hollow member of circular cross-section having an apertured top wall, a bowed side wall, and an open inlet mouth spaced from said apertured top wall, said walls and inlet mouth defining an unobstructed axial liquid path through said impeller, spaced opposed radially extending flanges on said impeller defining a centrifugal discharge passageway communicating with the major diameter portion of the impeller, and pumping vanes in said passageway cooperating with said flanges to define open-ended pumping channels receiving liquids from the impeller to centrifugally discharge the liquids while gases and vapors pass through the apertured top wall of the impeller.

11. An impeller for a centrifugal separator pump comprising a hollow barrel-shaped member having an apertured top wall, a bowed cylindrical side wall, and an outwardly flaring bottom inlet mouth, said bowed cylindrical side wall having the major diameter portion thereof spaced from said inlet mouth and said apertured top wall, radial flanges projecting in spaced opposed relation from said side wall at the major diameter portion thereof, pumping vanes between said flanges cooperating with the flanges to define open-ended centrifugal discharge pumping chambers, upstanding vanes on said side wall projecting into the impeller for whirling liquids therein, and an agitating propeller suspended at the bottom of the member.

RUSSELL R. CURTIS.